United States Patent [19]
Trepanier et al.

[11] 3,919,219
[45] Nov. 11, 1975

[54] 6-PYRIDYL-TETRAHYDRO-1,2,4-TRIAZINOQUINAZOLINES

[75] Inventors: Donald L. Trepanier; Shyam Sunder, both of Midland, Mich.

[73] Assignee: The Dow Chemical Company, Midland, Mich.

[22] Filed: Nov. 4, 1974

[21] Appl. No.: 520,701

[52] U.S. Cl. .......................... 260/248 AS; 424/249
[51] Int. Cl.² .................................. C07D 253/08
[58] Field of Search ............................ 260/248 AS

[56] References Cited
UNITED STATES PATENTS
3,873,543  3/1975  Berenyi et al. .................... 260/248

*Primary Examiner*—John M. Ford
*Attorney, Agent, or Firm*—Maynard R. Johnson

[57] ABSTRACT

Triazinoquinazoline compounds such as 3,4,6,7-tetrahydro-2-methyl-6-(4-pyridyl)-2H-1,2,4-triazino [4,3-c]quinazoline are prepared by the reaction of 3-(2-aminophenyl)-methyl-1,4,5,6-tetrahydro-1,2,4-triazine with an aldehyde or ketone. The compounds have pharmacological activity on the central nervous system.

4 Claims, No Drawings

6-PYRIDYL-TETRAHYDRO-1,2,4-TRIAZINOQUINAZOLINES

SUMMARY OF THE INVENTION

This invention is concerned with triazinoquinazoline compounds and is particularly directed to 6-(2,3 or 4-pyridyl)-3,4,6,7-tetrahydro-1,2,4-triazino[4,3-c] quinazoline compounds of the formula I

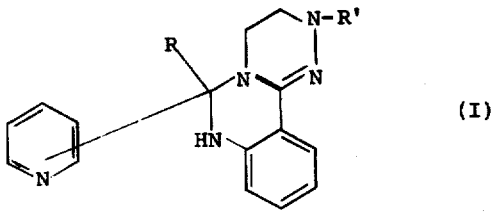

(I)

and their pharmaceutically acceptable acid addition salts. In the above formula I, and elsewhere in the present specification, R represents hydrogen or loweralkyl of one to three carbon atoms, and R' represents loweralkyl of one to three carbon atoms.

The term "pharmaceutically-acceptable salt" as herein employed refers to salts which are substantially non-toxic at dosage rates consistent with good pharmacological activity. Such pharmaceutically-acceptable salts include non-toxic acid addition salts with inorganic acids such as hydrochloric, hydrobromic, sulfuric or phosphoric acid, or with organic acids such as acetic, succinic, malic, maleic, tartaric or citric acid, or with organic sulfonic acids such as methanesulfonic or p-toluenesulfonic acid.

The compounds are crystalline solids at ordinary temperatures. The compounds have pharmacological activity, and can be administered to animals in the study of chemical effects on the central nervous system. In particular the compounds can be used as antidepressants, barbiturate potentiators, or analgesics as indicated by their activity in standard pharmacological evaluation procedures. The type and degree of pharmacological activity typically varies somewhat according to such factors as specific compound employed, dosage rate, dosage route, and size, age and species of animal and effect to be produced. For pharmacological use the compounds wherein R is methyl are particularly preferred.

Preparation of the Triazoloquinazolines

The compounds of the invention are prepared by the reaction of a 3-(2-aminophenyl)-1-loweralkyl-1,4,5,6-tetrahydro-1,2,4-triazine (Formula II) with an aldehyde or ketone of Formula III to obtain the corresponding 6-substituted-3,4,6,7-tetrahydro-2-loweralkyl-2H-1,2,4-triazino[4,3-c]quinazoline of Formula I.

In the above formulae II and III, R' and R have the significance set out above with respect to Formula I.

The reaction of the aminophenyltriazine and the aldehyde or ketone proceeds when the reactants are contacted and mixed, in the presence of an inert organic solvent as a reaction medium, and an organic acid catalyst such a p-toluene sulfonic acid when a ketone reactant is employed. Suitable inert solvents include ethanol, methanol, and propanol when an aldehyde reactant is employed and benzene when a ketone is employed. When an aldehyde is employed the reaction proceeds at temperatures from about 25° to the boiling temperature of the mixture. It is generally desirable to heat the reaction mixture to the boiling temperature under reflux. The reaction is generally complete within about 2 to about 24 hours, depending upon temperature and choice of solvent.

When a ketone is employed the benzene solution containing a catalytic amount of an organic acid such as p-toluene sulfonic acid is heated under reflux and the water separated by means of a Dean-Stark water trap. The appropriate amount of water is usually collected in from four to eighteen hours signifying the reaction has gone to completion.

The product can be separated by conventional procedures, such as evaporation of reaction medium and unreacted aldehyde or ketone, or cooling of the reaction mixture to induce crystallization of the compound, followed by filtration. The product can be purified by conventional procedures such as recrystallization and washing.

The exact proportions of the reactants to be employed are not critical, some of the desired product being obtained when the reactants are combined over a wide range of proportions. The reaction consumes the reactants in equimolar proportions and in a preferred procedure, the reactants are employed in proportions from substantially equimolar amounts of each reactant to about 10 percent molar excess of either reactant.

The pharmaceutically-acceptable salts are conveniently prepared by dissolving the free base compound in a solvent such as diethyl ether and thereafter adding an excess of a pharmaceutically-acceptable acid such as hydrochloric, hydrobromic, sulfuric, malic, maleic or p-toluenesulfonic acid or the like until precipitation of the product is complete. The product can be separated by conventional procedures such as evaporation, filtration or centrifugation and purified by conventional procedures such as recrystallization.

DESCRIPTION OF PREFERRED EMBODIMENTS

The following example illustrates the invention.

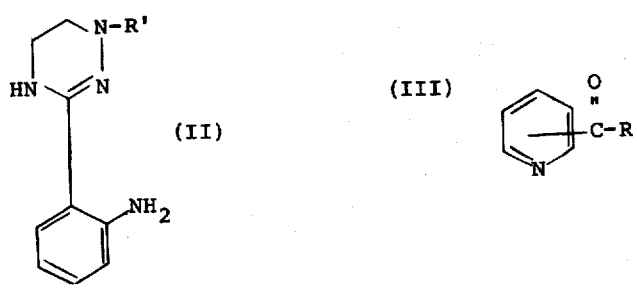

EXAMPLE

The compounds listed below are prepared by heating about 0.02–0.03 moles of the corresponding 3-(2-aminophenyl)-1-loweralkyl-1,4,5,6-tetrahydro-1,2,4-triazine with an equimolar amount of the corresponding aldehyde in sufficient ethanol (about 150 milliliters) at the boiling temperature for 6 hours; cooling the mixture to room temperature, filtering to remove the product as a filter cake, and recrystallizing from isopropanol or ethanol, 6-(3-Pyridyl)-1-methyl-3,4,6,7-tetrahydro-2H-1,2,4-triazino[4,3-c]-quinazoline; melting at 155°–156°C.; C,H,N, calculated: 68.8, 6.1, 25.1; found: 68.7, 6.3, 25.2; recrystallized from ethanol, 6-(2-Pyridyl)-1-methyl-3,4,6,7-tetrahydro-2H-1,2,4-triazino[4,3-c]quinazoline, melting at 143°–145°C.; C,H,N, calculated: 68.8, 6.1, 25.1; found: 68.6, 6.1, 25.0; recrystallized from isopropanol, 6-(4-Pyridyl)-1-methyl-3,4,6,7-tetrahydro-2H-1,2,4-triazino[4,3-c]quinazoline, melting at 188°–189.5°C., C,H,N, calculated: 68.8, 6.1, 25.1; found: 68.5, 6.2, 24.8, recrystallized from isopropanol, 6-(3-Pyridyl)-1-propyl-3,4,6,7-tetrahydro-2H-1,2,4-triazino[4,3-c]quinazoline, molecular weight 307.

6-(2-Pyridyl)-1-ethyl-3,4,6,7-tetrahydro-2H-1,2,4-triazino[4,3-c]quinazoline, molecular weight 293.

In a similar procedure, 0.2 to 0.4 moles of the corresponding 3-(2-aminophenyl)-1-loweralkyl-2H-1,4,5,6-tetrahydro-1,2,4-triazine and an equimolar amount of the corresponding ketone are mixed with 1 gram p-toluenesulfonic acid in 250 milliliters benzene and heated at the boiling temperature under reflux for 18 hours. Water of reaction is removed with a Dean-Stark trap. The mixture is cooled to room temperature, washed with dilute sodium carbonate solution then with water, dried over magnesium sulfate, and evaporated in vacuo. The residual solid is recrystallized from ethanol.

6-Propyl-6-(4-pyridyl)-1-propyl-3,4,6,7-tetrahydro-2H-1,2,4-triazino[4,3-c]quinazoline, molecular weight 349.

6-Methyl-6-(2-pyridyl)-1-methyl-3,4,6,7-tetrahydro-2H-1,2,4-triazino[4,3-c]quinazoline, molecular weight 293.

6-Methyl-6-(3-pyridyl)-1-propyl-3,4,6,7-tetrahydro-2H-1,2,4-triazino[4,3-c]quinazoline, molecular weight 321.

1,6-Diethyl-6-(2-pyridyl)-3,4,6,7-tetrahydro-2H-1,2,4-triazino[4,3-c]quinazoline, molecular weight 321.

In standard pharmacological evaluation procedures (see, e.g., U.S. Pat. Nos. 3,641,019 and 3,485,921), the compound 6-(4-pyridyl)-1-methyl-3,4,6,7-tetrahydro-2H-1,2,4-triazino[4,3-c]quinazoline is found to extend hexobarbital induced sleep in mice by a factor of at least two, when the test compounds are administered intraperitoneally at 60 milligrams per kilogram 30 minutes before hexobarbital, and to reinduce sleep in mice pretreated with hexobarbital when administered after mice have awakened from hexobarbital induced sleep. The compound 6-(3-pyridyl)-1-methyl-3,4,6,7-tetrahydro-2H-1,2,4-triazino[4,3-c]quinazoline is found to inhibit reserpine induced ptosis in mice at an equivalent dosage rate, and also to prolong hexobarbital sleep time.

The 2-aminophenyl triazine starting material can be prepared by reacting 2-aminophenyl cyanide with hydrogen sulfide in pyridine and triethylamine to obtain 2-aminophenylthiobenzamide, and then reacting the thiobenzamide with 1-methyl-1-(2-aminoethyl)hydrazine. For example, 100 grams of 2-aminophenyl cyanide in a mixture of 500–600 milliliters of pyridine and 100 milliliters triethylamine is stirred at about 25°C. while hydrogen sulfide is passed through the mixture for three hours. The product is separated, and 4 grams of the product are mixed with 1.8–2.0 grams 1-methyl-1-(2-aminoethyl)hydrazine for two hours at about 100°–120°C. to drive off hydrogen sulfide of reaction. Ethanol is added and the mixture is boiled for 30 minutes under reflux, cooled, diluted with ether until a precipitate forms, and filtered. The aminophenyl triazine filter cake is recrystallized from isopropanol and found to melt at 140°–141°C.

What is claimed is:

1. A 1,2,4-triazino quinazoline corresponding to the formula:

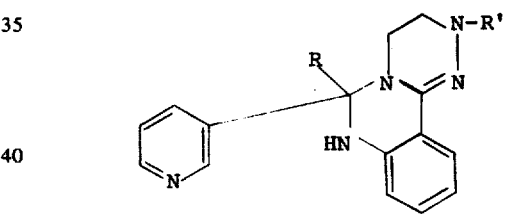

wherein R represents hydrogen or loweralkyl of one to three carbon atoms, and R' represents loweralkyl of one to three carbon atoms, and their pharmaceutically-acceptable acid addition salts.

2. A compound of claim 1 wherein R represents hydrogen.

3. A compound of claim 2 wherein the R' is methyl.

4. A compound of claim 3 wherein the compound is 6-(4-pyridyl)-1-methyl-3,4,6,7-tetrahydro-2H-1,2,4-triazino[4,3-c]quinazoline.

* * * * *